Oct. 15, 1963   G. E. RINDONE   3,107,178
HIGH DIELECTRIC CONSTANT GLASS
Original Filed June 28, 1956
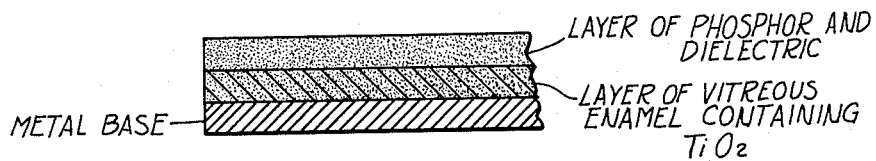
GUY F. RINDONE
INVENTOR.

United States Patent Office 3,107,178
Patented Oct. 15, 1963

3,107,178
HIGH DIELECTRIC CONSTANT GLASS
Guy E. Rindone, State College, Pa., assignor to Sylvania Electric Products Inc., a corporation of Delaware
Original application June 28, 1956, Ser. No. 594,587, now Patent No. 2,906,631, dated Sept. 29, 1959. Divided and this application Aug. 5, 1959, Ser. No. 831,717
8 Claims. (Cl. 117—217)

This invention relates to glasses suitable as dielectrics, and particularly to glasses of high dielectric constant. The invention especially relates to glasses which can be applied as vitreous enamels in thin coatings upon suitable base materials.

Such enamels are especially useful in electroluminescent devices, for example, when used in such devices as a dielectric layer in series with a phosphor-dielectric layer. However, the use of the enamels is not confined to such devices, but has broader application.

The dielectric constant of ordinary glass, of the soda, lime, or silica type is generally about 5. I have discovered, however, that glass of dielectric constant of 15 or more can be obtained with glass from a melt of titanium, silica and boric oxide as the main ingredients, with the addition of zinc, barium or alkaline oxides.

I have further discovered that while such compositions, when applied to a glass base, for example to a glass base having a conductive coating such as the usual stannous chloride or the ilke, have a dielectric constant of 15, the dielectric constant can be as high as 25,000 or more when the coating is applied to a base of iron, such as a sheet of enamelling steel. This is a tremendous and unexpected increase, which may be due to a partial reduction of the titanium from a valence of four to a valence of three. However, the decrease of valence in other ways, for example, by the addition of metallic iron powder to the glass melt, is much less effective, although it raises the dielectric constant above the value that the glass would have without it.

The increase dielectric constant obtained with my enamel when coated on an iron base can also be obtained when the enamel is applied to a metal such as so-called "No. 4 alloy," often used for hermetic metal to glass seals, which is only about half iron, the remainder being chiefly nickel and chromium. The composition of "No. 4 alloy" is given in a printed publication entitled "Data Memorandum No. 15," from Superior Tube Co., Norristown, Pennsylvania, dated May 15, 1954, as containing 41.50 to 42.50% nickel, 5.40 to 5.90% chromium, 0.15 to 0.25% manganese, 0.15 to 0.30% silicon, with maximum permissible amounts of 0.07% carbon, 0.025% phosphorous, 0.025% sulfur, 0.15% aluminum, and the balance iron.

The high dielectric constant of my new glass or enamel appears to be due to some of the materials being present in the glass in the crystal phase. When zinc or barium oxides are used in the glass melt, some zinc titanate ($ZnO.TiO_2$) or barium titanate ($BaO.2TiO_2$) appears to be formed, with rutile or anatase in lesser amounts. The presence of large amounts of rutile or anatase, however, appears detrimental to the formation of material of high dielectric constant.

The heat treatment of the glass melt is an important factor in obtaining a high dielectric constant. The ingredients can be fused at a temperature between about 1050° C. to 1450° C. for one to three hours, and then cooled quickly for example, by being quenched in water. With slow cooling, the dielectric constant will be much less for example about 300, whereas with quenching the constant can be as great as 25,000 or more.

Other objects, features and advantages of the invention will be apparent from the following description, taken in connection with the accompanying drawing, in which the FIGURE shows a base coated with enamel according to the invention.

The enamel can be made, for example, by mixing the following ingredients as fine powders:

| | Grams |
|---|---|
| $TiO_2$ | 694 |
| $SiO_2$ | 788 |
| $H_3BO_3$ | 855 |
| $ZnO$ | 1043 |
| $Ba(NO_3)2$ | 598 |
| $K_2CO_3$ | 167 |

Other compounds than those specified can be used, in general either oxides or compounds reducible to the oxides, such as carbonates.

The ingredients are mixed intimately by being rolled dry in a drum for about one hour. The mixture is then melted at a temperature of about 1290° C. for about 2 hours, although the temperature can be between about 1050° C. and about 1450° C. and the time can be between about one and three hours, the longer time being generally used with the lower temperature, and vice-versa.

The melt is then quenched by being poured into water at room temperature. The shock of quenching will break up the melt into generally small particles, say about $\frac{1}{16}$ inch in particle size.

The resultant glass frit is then dried, and about 1500 grams of it is mixed with enough amyl acetate to make a suspension of about 1000 cc. and milled in a one-quart ball-mill for between about two to three days, about 60 hours generally being enough for proper mixing. The material is then passed through a screen to limit the particle size, the screen being, for example, of 200-mesh.

The suspension, with addition of a further but small amount, generally about 500 cc., of amyl acetate, to bring the suspension to a spraying consistency, is sprayed onto the base material, which can be, for example, a sheet of enamelling steel, which may conveniently be of the standard 0.012 inch.

If the resultant piece is to be part of an electroluminescent device, the coating should be sprayed to a thickness of about 4 to 6 one-thousandths of an inch. This will generally require the spraying of about 0.2 gram per square inch of base area. The coating is then dried and fired at between 750° C. to 800° C. for one to three minutes, the longer time being preferably used with the lower temperature, and vice versa. Firing of 800° C. for about one minute will be satisfactory. The enamel coating 2 will be fused to the metal base 1 by the firing.

This application is a division of application Serial No. 594,587, filed June 28, 1956, and now issued as U.S. Patent 2,906,631.

The coating will have a blueish tint, due to reduction of the titanium, and if sprayed onto enamelling steel will have a dielectric constant of many thousands.

Where the enamel is to be used on other than an iron base, a small amount, say ½% by weight of fine iron particles, which can be fine enough to pass through a 200-mesh screen, can be added to the original batch.

The ingredients in the initial mix may be varied over the following ranges with good results.

| | Mol percent |
|---|---|
| $TiO_2$ | 19 to 36 |
| $SiO_2$ | 20 to 37 |
| $ZnO$ | 1 to 29 |
| $K_2O$ | 2 to 14 |
| $BaO$ | 0 to 10 |
| $B_2O_3$ | 4 to 21 |

Although the alkaline oxide listed above is of potassium, sodium or lithium can also either separately, or with the potassium, or with each other, or all three be used, the total alkaline oxide being between about 2 to about 14 with good results.

With some of the above mixtures the firing temperature of the sprayed coating may be as low as 550° C., if the firing time is about ten minutes.

The leakage resistance of the dielectric layer produced by my invention will generally be between several hundred ohms and several thousand ohms, for a thickness of layer of about 4 to 6 one thousandths of an inch, and an area of 12 square inches.

What I claim is:

1. A glass of high dielectric constant containing titanium oxide and metallic iron particles.

2. A glass of high dielectric constant, said glass comprising about 19 to 36 mol percent $TiO_2$, about 20 to 37 mol percent $SiO_2$, about 1 to 29 mol percent ZnO, about 0 to 10 mol percent barium oxide, about 4 to 21 mol percent boric oxide, and about 2 to 14 mol percent of a substance selected from the group consisting of potassium oxide, sodium oxide, lithium oxide, and mixtures thereof, and an amount of metallic iron sufficient to give a blueish tint to the glass.

3. An electroluminescent device comprising a layer of glass in fused contact with a base of metallic iron and containing titanium oxide, and a phosphor-dielectric layer over said glass layer.

4. An electroluminescent device comprising a glass layer of high dielectric constant containing titanium oxide and metallic iron particles, and a phosphor-dielectric layer over said glass layer.

5. An electroluminescent device comprising a phosphor-dielectric layer in series with a layer of a glass of high dielectric constant, said glass comprising about 19 to 36 mol percent $TiO_2$, about 20 to 37 mol percent $SiO_2$, about 1 to 29 mol percent ZnO, about 0 to 10 mol percent barium oxide, about 4 to 21 mol percent boric oxide, and about 2 to 14 mol percent of a substance selected from the group consisting of potassium oxide, sodium oxide, lithium oxide, and mixtures thereof, and a small amount of metallic iron.

6. An electroluminescent device comprising an iron-containing metal plate and a titanium-containing glass layer fused thereto, and a phosphor-dielectric layer over said glass layer, said plate containing enough iron to give a blueish tint to the glass.

7. An electroluminescent device comprising a metal plate containing a substantial proportion of iron, a glass containing titanium oxide fused to said plate, and a phosphor-dielectric layer over said glass layer, the amount of iron in said plate being sufficient to give a blueish tint to the glass.

8. An electroluminescent device comprising an iron sheet, a layer of glass fused thereto, said glass comprising about 19 to 36 mol percent $TiO_2$, about 20 to 37 mol percent $SiO_2$, about 1 to 29 mol percent ZnO, about 0 to 10 mol percent barium oxide, about 4 to 21 mol percent boric oxide, and about 2 to 14 mol percent of a substance selected from the group consisting of potassium oxide, sodium oxide, lithium oxide, and mixtures thereof, and a phosphor-dielectric layer over said glass layer.

References Cited in the file of this patent

UNITED STATES PATENTS

| | | |
|---|---|---|
| 899,873 | Kodjbanoff | Sept. 29, 1908 |
| 2,590,893 | Sandborn | Apr. 1, 1952 |
| 2,662,020 | Schofield | Dec. 8, 1953 |
| 2,681,861 | Hushley | June 22, 1954 |
| 2,707,157 | Stanton et al. | Apr. 26, 1955 |
| 2,720,473 | Donabey | Oct. 11, 1955 |
| 2,776,217 | Gott | Jan. 1, 1957 |
| 2,824,992 | Bouchard et al. | Feb. 25, 1958 |
| 2,829,062 | Bennett et al. | Apr. 1, 1958 |
| 2,842,458 | Feeney et al. | July 8, 1958 |
| 2,843,507 | Long | July 15, 1958 |
| 2,866,117 | Walker | Dec. 23, 1958 |
| 2,882,187 | Kwate | Apr. 14, 1959 |
| 2,887,402 | Ballard | May 19, 1959 |
| 2,906,631 | Rindone | Sept. 29, 1959 |
| 2,980,817 | Gaiser | Apr. 18, 1961 |